(12) United States Patent
Yonekubo et al.

(10) Patent No.: US 11,754,839 B2
(45) Date of Patent: Sep. 12, 2023

(54) DISPLAY MODULE AND DISPLAY DEVICE

(71) Applicant: SEIKO EPSON CORPORATION, Tokyo (JP)

(72) Inventors: Masatoshi Yonekubo, Nagano-Ken (JP); Mitsutaka Ide, Shiojiri (JP); Takashi Takeda, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 213 days.

(21) Appl. No.: 17/161,676

(22) Filed: Jan. 29, 2021

(65) Prior Publication Data
US 2021/0239987 A1 Aug. 5, 2021

(30) Foreign Application Priority Data

Jan. 31, 2020 (JP) ................ 2020-014619

(51) Int. Cl.
*G02B 27/01* (2006.01)
*G02B 6/28* (2006.01)
*G02B 6/293* (2006.01)
*G02B 6/35* (2006.01)

(52) U.S. Cl.
CPC ....... *G02B 27/0172* (2013.01); *G02B 6/2848* (2013.01); *G02B 6/2931* (2013.01); *G02B 6/29328* (2013.01); *G02B 6/3534* (2013.01); G02B 2027/0178 (2013.01); G02B 2027/0187 (2013.01)

(58) Field of Classification Search
CPC G02B 27/0172; G02B 6/2848; G02B 6/2931; G02B 6/29328; G02B 6/3534; G02B 2027/0178

USPC .......................................... 359/13, 630, 633
See application file for complete search history.

(56) References Cited

U.S. PATENT DOCUMENTS 6,594,085 B2 * 7/2003 Ohtaka .............. G02B 27/0172
359/633
6,919,976 B2 * 7/2005 Kasai ................. G02B 27/0081
359/13

(Continued)

FOREIGN PATENT DOCUMENTS

EP 3287835 2/2018
JP 2002162598 6/2002
(Continued)

*Primary Examiner* — Audrey Y Chang
(74) *Attorney, Agent, or Firm* — JCIPRNET

(57) ABSTRACT

A display module includes an image light generation device, a light-guiding member, a first reflection surface configured to reflect the imaging light incident via the light-guiding member, a first diffraction element configured to diffract the imaging light, and a second diffraction element configured to diffract the image light and form an exit pupil. The image light is sequentially incident on a first deflection surface, a second deflection surface, a second reflection surface, a third reflection surface, a fourth reflection surface, and a third deflection surface inside the light-guiding member, and a distance from a reference position where an optical axis of the exit pupil and an emission surface intersect to the second deflection surface is longer than a distance from the reference position to the first deflection surface and longer than a distance from the reference position to the second reflection surface.

8 Claims, 4 Drawing Sheets

(56) References Cited

U.S. PATENT DOCUMENTS

| | | | |
|---|---|---|---|
| 7,699,473 B2* | 4/2010 | Mukawa | G02B 17/086 359/13 |
| 2003/0086135 A1 | 5/2003 | Takeyama | |
| 2013/0222919 A1* | 8/2013 | Komatsu | G02B 27/0172 359/630 |
| 2018/0067325 A1 | 3/2018 | Yonekubo et al. | |

FOREIGN PATENT DOCUMENTS

| | | |
|---|---|---|
| JP | 2002311379 | 10/2002 |
| JP | 2016166930 | 9/2016 |
| JP | 2017058400 | 3/2017 |
| WO | 2016171012 | 10/2016 |

* cited by examiner

DISPLAY MODULE AND DISPLAY DEVICE

The present application is based on, and claims priority from JP Application Serial Number 2020-014619, filed Jan. 31, 2020, the disclosure of which is hereby incorporated by reference herein in its entirety.

BACKGROUND

1. Technical Field

The present disclosure relates to a display module and a display device.

2. Related Art

A head-mounted display apparatus configured to guide image light to an eye of an observer while using a plurality of reflection surfaces to reflect the image light is known. In JP-A-2002-311379 described below, there is disclosed an observation optical system of an image display device including an image display element, a relay optical system including a first reflection-type volume hologram, and an eyepiece optical system including a second reflection-type hologram. In this observation optical system, a light-guiding plate is provided between the first reflection-type volume hologram and the second reflection-type volume hologram, and light emitted from the first reflection-type volume hologram is reflected an odd number of times greater than or equal to three times inside the light-guiding plate.

In the image display device described above, color aberrations due to wavelength dispersion occur when a volume hologram is used to deflect the image light. Therefore, in order to compensate for the color aberrations, a volume hologram element is provided on both an incident side and an exit side as in the optical system of JP-A-2002-311379, and compensation for the wavelength dispersion is made by the two volume hologram elements. However, predetermined conditions, such as disposing the two volume hologram elements symmetrically relative to the light-guiding member, must be satisfied, resulting in an increase in size of the light-guiding member.

In particular, when a screen of a head-mounted display apparatus is increased in size, an angle of the image light traveling inside the light-guiding member increases, causing an increase in a thickness and a length of the light-guiding member. As a result, the light-guiding member becomes heavier and a load on a nose of a user increases, causing a deterioration in wearability of the head-mounted display apparatus. Further, JP-A-2002-311379 describes, by way of example, a configuration in which the image light is reflected five times inside the light-guiding member. However, this configuration is problematic in that it is difficult to appropriately arrange optical elements, such as an image light generation device and a relay optical system, relative to a head of the observer.

SUMMARY

To solve the problems described above, a display module according to one aspect of the present disclosure includes an image light generation device configured to generate image light, a light-guiding member configured to guide the image light emitted from the image light generation device, a first reflection surface configured to reflect the image light that is emitted from the image light generation device, passes through the light-guiding member, and is incident, a first diffraction element including a first incident surface and configured to diffract and deflect the image light that is emitted from the image light generation device, passes through the light-guiding member, and enters through the first incident surface, and a second diffraction element including a second incident surface and configured to diffract and deflect the image light that is emitted from the first diffraction element, passes through the light-guiding member, and enters through the second incident surface, and emit the image light from the light-guiding member, thereby forming an exit pupil. The light-guiding member includes a first deflection surface, a second deflection surface, a second reflection surface, a third reflection surface, a fourth reflection surface, a third deflection surface, and an emission surface. The image light emitted from the image light generation device is sequentially incident on the first deflection surface, the second deflection surface, the second reflection surface, the third reflection surface, the fourth reflection surface, and the third deflection surface inside the light-guiding member. The first reflection surface is provided at one of the first deflection surface and the second deflection surface, the first diffraction element is provided at the other of the first deflection surface and the second deflection surface, and the second diffraction element is provided at the third deflection surface. A distance from a reference position where an optical axis of the exit pupil and the emission surface intersect to the second deflection surface is longer than a distance from the reference position to the first deflection surface and longer than a distance from the reference position to the second reflection surface.

A display device according to one aspect of the present disclosure includes the display module according to an aspect of the present disclosure and a housing configured to accommodate the display module.

DESCRIPTION OF EXEMPLARY EMBODIMENTS

First Exemplary Embodiment

A first exemplary embodiment according to the present disclosure will be described below with reference to FIG. 1 to FIG. 4.

Figure 1:
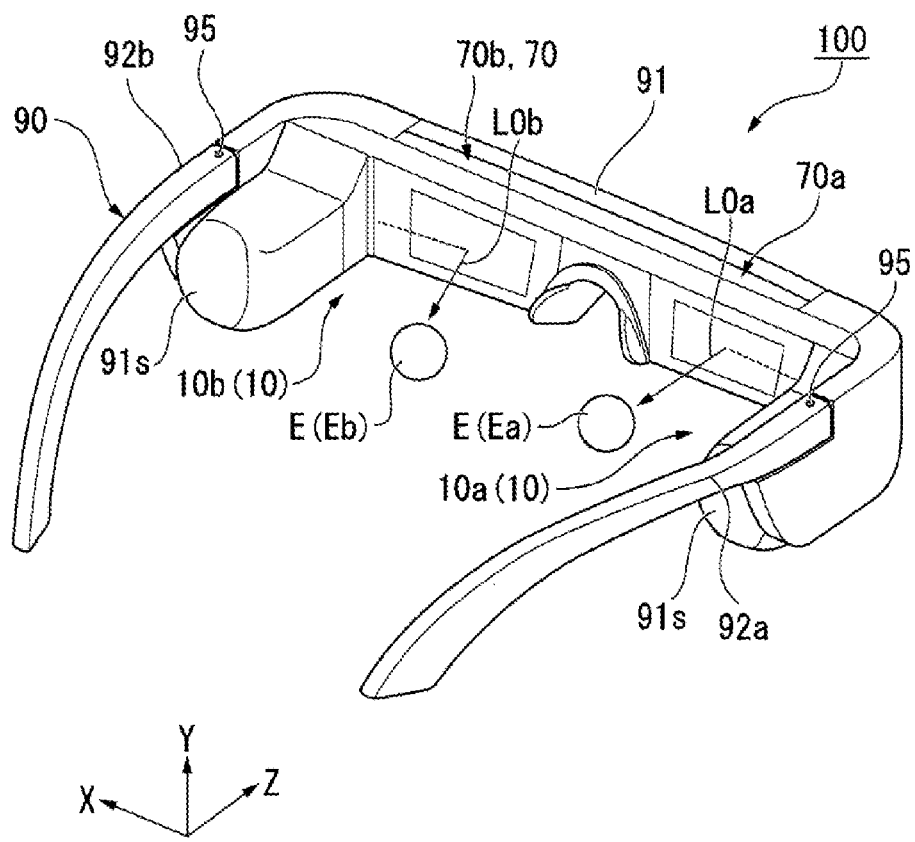
FIG. 1 is a perspective view of a display device according to a first exemplary embodiment.
Figure 2:
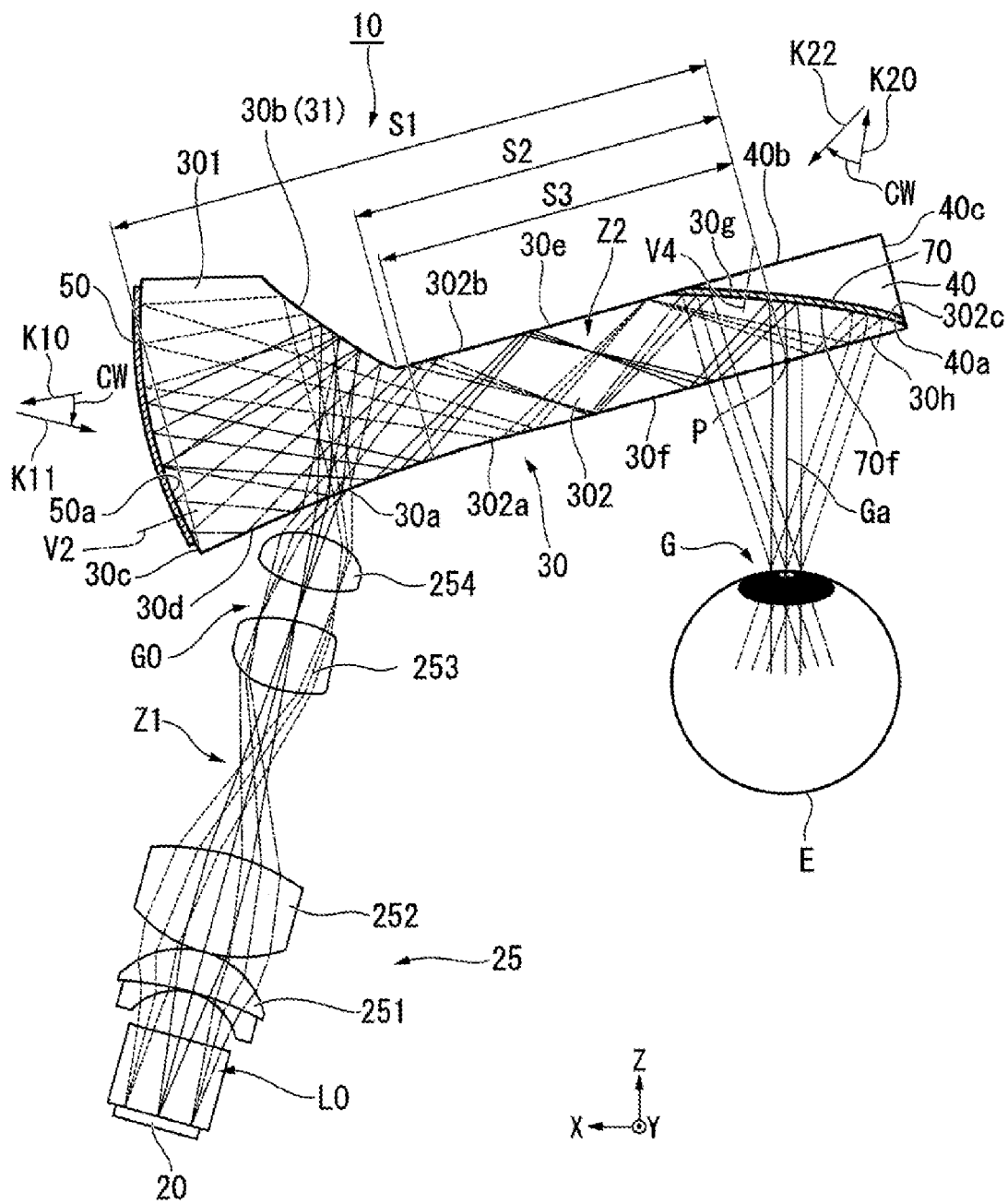
FIG. 2 is a plan view illustrating a schematic configuration of a display module according to the first exemplary embodiment.

FIG. 1 is a perspective view illustrating a head-mounted display apparatus of this exemplary embodiment. FIG. 2 is a plan view illustrating a schematic configuration of a display module of the head-mounted display apparatus.

In the following description, the head-mounted display apparatus is simply referred to as a display device. Further, in the drawings, the dimensions of some components may be scaled differently for ease of understanding of the components.

In the drawings, based on a front-rear direction, a left-right direction, and an up-down direction when a display device 100 is mounted onto a head of an observer, the following directions are defined. An axis in the up-down direction is a Y-axis, a direction upward from below is a +Y direction, and a direction downward from above is a −Y direction. An axis in the front-rear direction is a Z-axis, a direction frontward from the rear is a +Z direction, and a direction rearward from the front is a −Z direction. An axis in the left-right direction is an X-axis, a direction leftward from the right is a +X direction, and a direction rightward from the left is a −X direction. The Y-axis, the Z-axis, and the X-axis are orthogonal to each other.

When the directions described above are defined using the components of the display device 100, an axis connecting a center of a second diffraction element 70a of a right-eye display module 10a and a center of a second diffraction element 70b of a left-eye display module 10b is the X-axis, a direction from the second diffraction element 70a toward the second diffraction element 70b is the +X direction, and a direction from the second diffraction element 70b toward the second diffraction element 70a is the −X direction. In a display module 10 described later, an optical axis of an exit pupil is the Z-axis, a direction from the exit pupil toward the second diffraction element 70a or the second diffraction element 70b is the +Z direction, and a direction from the second diffraction element 70a or the second diffraction element 70b toward the exit pupil is the −Z direction. An axis in a vertical direction of a display surface of an image light generation device 20 is the Y-axis, a direction upward from below the display surface is the +Y direction, and a direction downward from above the display surface is the −Y direction.

As illustrated in FIG. 1, the display device 100 includes the right-eye display module 10a configured to cause image light L0a to be incident on a right eye Ea, the left-eye display module 10b configured to cause image light L0b to be incident on a left eye Eb, and a housing 90 configured to accommodate the right-eye display module 10a and the left-eye display module 10b. The display device 100 has, for example, an eyeglasses-like shape. The display device 100 is mounted onto the head of the observer by the housing 90.

The housing 90 includes a frame 91, a temple 92a provided on the right side of the frame 91 and locked on a right ear of the observer, and a temple 92b provided on the left side of the frame 91 and locked on a left ear of the observer. The frame 91 includes storage spaces 91s on both side portions, and components such as the various optical elements that constitute the display module 10 described later are accommodated inside the storage spaces 91s. The temples 92a, 92b are foldably coupled to the frame 91 by hinges 95.

The right-eye display module 10a and the left-eye display module 10b differ in that the optical members are disposed symmetrically, but the basic configurations are the same. Accordingly, the right-eye display module 10a and the left-eye display module 10b will be described as the display module 10 without distinction in the description below.

As illustrated in FIG. 2, the display module 10 of this exemplary embodiment includes the image light generation device 20, a relay optical system 25, a light-guiding member 30, a first diffraction element 50, a second diffraction element 70, and a correction member 40.

The image light generation device 20 is configured to generate image light L0. The light-guiding member 30 is configured to guide the image light L0 emitted from the image light generation device 20. The first diffraction element 50 includes a first incident surface 50a, and is configured to diffract and deflect the image light L0 emitted from the image light generation device 20 and incident from the first incident surface 50a via the light-guiding member 30. The second diffraction element 70 includes a second incident surface 70f, and is configured to diffract, deflect, and emit, from the light-guiding member 30, the image light L0 incident from the second incident surface 70f via the light-guiding member 30, and form an exit pupil G.

The image light generation device 20 is constituted by a display panel such as an organic electroluminescent display panel, for example. In a state in which the observer is wearing the display device 100, the image light generation device 20 is disposed somewhat rearward of an eye E, and is configured to emit the image light L0 obliquely frontward, toward a face.

Note that the image light generation device 20 may include a plurality of display panels corresponding to different colors, and a synthesis optical system configured to synthesize image light of the respective colors emitted from the plurality of display panels. Further, the image light generation device 20 may include an illumination light source and a display panel such as a liquid crystal display element configured to modulate illumination light emitted from the illumination light source. Alternatively, the image light generation device 20 may have a configuration in which laser light is modulated using a micro-mirror device. Alternatively, the image light generation device 20 may be constituted by micro light-emitting diodes (LEDs), micro-electromechanical systems (MEMS) displays, and the like.

The relay optical system 25 is an optical system configured to project the image light L0 generated by the image light generation device 20, and is constituted by a plurality of lenses. In the case of this exemplary embodiment, the relay optical system 25 includes a first lens 251, a second lens 252, a third lens 253, and a fourth lens 254. In FIG. 2, an example is given in which the relay optical system 25 is constituted by four lenses, but the number of lenses is not particularly limited. Furthermore, the plurality of lenses may include a configuration in which two or more lenses are bonded together, for example, a bonded achromatic lens or the like. Further, each lens may be a non-spherical lens, such as a free curved lens, or may be a spherical lens.

The light-guiding member 30 is constituted by a long plate material having transmissivity, such as plastic or glass, for example. The light-guiding member 30 extends at an angle of less than 450 relative to the X-axis, and is configured to guide the image light L0 incident from one end portion in the extending direction toward the other end portion. The light-guiding member 30 includes an incident surface 30a, a first deflection surface 30b, a second deflection surface 30c, a second reflection surface 30d, a third reflection surface 30e, a fourth reflection surface 30f, a third deflection surface 30g, and an emission surface 30h. The image light L0 emitted from the image light generation device 20 sequentially travels, inside the light-guiding member 30, to the first deflection surface 30b, the second deflection surface 30c, the second reflection surface 30d, the third reflection surface 30e, the fourth reflection surface 30f, and the third deflection surface 30g.

In the case of this exemplary embodiment, the first deflection surface 30b is provided with a first reflection surface 31. The second deflection surface 30c is provided with the first diffraction element 50. The third deflection surface 30g is provided with the second diffraction element 70.

Note that, of the incident surface 30a, the first deflection surface 30b, the second deflection surface 30c, the second reflection surface 30d, the third reflection surface 30e, the fourth reflection surface 30f, the third deflection surface 30g, and the emission surface 30h, the incident surface 30a, the second reflection surface 30d, the fourth reflection surface 30f, and the emission surface 30h constitute a single continuous surface of the light-guiding member 30, and the third reflection surface 30e and the third deflection surface 30g constitute another single continuous surface. Accordingly, in this specification, regions in which image light having a predetermined angle of view is actually incident are respectively referred to as the incident surface 30a, the first deflection surface 30b, the second deflection surface 30c, the second reflection surface 30d, the third reflection surface 30e, the fourth reflection surface 30f, the third deflection surface 30g, and the emission surface 30h.

Hereinafter, of the light-guiding member 30, a portion provided with the first deflection surface 30b and the second deflection surface 30c is referred to as an incidence portion 301, and a portion provided with the second reflection surface 30d, the third reflection surface 30e, the fourth reflection surface 30f, the third deflection surface 30g, and the emission surface 30h is referred to as a light-guiding portion 302. A portion of the incidence portion 301 protrudes, relative to the light-guiding portion 302, to a side opposite to a side facing the face of the observer, that is, frontward. Accordingly, a thickness of the incidence portion 301 is thicker than a thickness of the portion provided with the light-guiding portion 302.

Of the two surfaces of the light-guiding portion 302, a surface facing the face of the observer is referred to as a first surface 302a, and a surface different from the first surface 302a is referred to as a second surface 302b. The first surface 302a and the second surface 12b are substantially parallel. That is, the light-guiding portion 302 is constituted by a parallel plate in which the first surface 302a and the second surface 302b are substantially parallel. The second reflection surface 30d, the fourth reflection surface 30f, and the emission surface 30h are provided to the first surface 302a. The third reflection surface 30e is provided at the second surface 302b. Further, of the second surface 302b, a portion on a center side of the face of the observer is an inclined surface 302c inclined relative to the first surface 302a. The inclined surface 302c is a curved surface in which a central portion relative to both end portions protrudes to a side opposite to the face of the observer. The third deflection surface 30g is provided at the inclined surface 302c.

In the incidence portion 301, the first deflection surface 30b and the second deflection surface 30c face each other and are inclined at a predetermined angle relative to the first surface 302a and the second surface 302b of the light-guiding portion 302. The incident surface 30a is a surface continuous with the first surface 302a of the light-guiding portion 302.

The first reflection surface 31, the second reflection surface 30d, the third reflection surface 30e, and the fourth reflection surface 30f reflect the image light L0 that travels through the interior of the light-guiding member 30. When a total reflection of an interface between a constituent material of the light-guiding member 30 and a medium surrounding the light-guiding member 30, for example, air, is utilized when the image light L0 is reflected, formation of films on the first reflection surface 31, the second reflection surface 30d, the third reflection surface 30e, and the fourth reflection surface 30f is not required. In this case, absorption by the film does not occur, which is preferable. However, it is desirable to use a high refractive index material for the constituent material of the light-guiding member 30 so that a difference in refractive index between the constituent material of the light-guiding member 30 and the medium surrounding the light-guiding member 30 increases. Alternatively, the first reflection surface 31, the second reflection surface 30d, the third reflection surface 30e, and the fourth reflection surface 30f may be provided with a reflection film such as a dielectric multilayer film or a metal film. Note that the first reflection surface 31, the second reflection surface 30d, the third reflection surface 30e, and the fourth reflection surface 30f may be provided with a hard coat film, an antireflection film, or the like. In this case, one of two surfaces of the hard coat film may be a total reflection surface.

The first reflection surface 31 is configured to reflect the image light L0 emitted from the image light generation device 20 and incident on the light-guiding member 30 from the incident surface 30a toward the first diffraction element 50. The image light L0 incident on the first reflection surface 31 from a direction close to parallel to the Z-axis is reflected in a direction away from the face of the observer.

The first diffraction element 50 includes a reflection-type volume hologram. The first diffraction element 50 has a recessed curved surface in which the first incident surface 50a on which the image light L0 is incident is recessed. In other words, the first incident surface 50a has a shape in which a central portion is recessed and curved relative to a peripheral portion in the incident direction of the image light L0. Thus, the first diffraction element 50 includes positive power and can efficiently deflect the image light L0 toward the second deflection element 30d.

Note that the first diffraction element 50 need only be a reflection-type diffraction element, is not limited to a volume hologram, and may be, for example, a surface relief-type diffraction element, a surface relief holographic element, or the like. Regardless of the configuration, when the image light L0 is incident from a normal line direction of the first incident surface 50a, the first diffraction element 50 has a property of emitting diffraction light having the highest diffraction efficiency in one specific direction.

Figure 3:
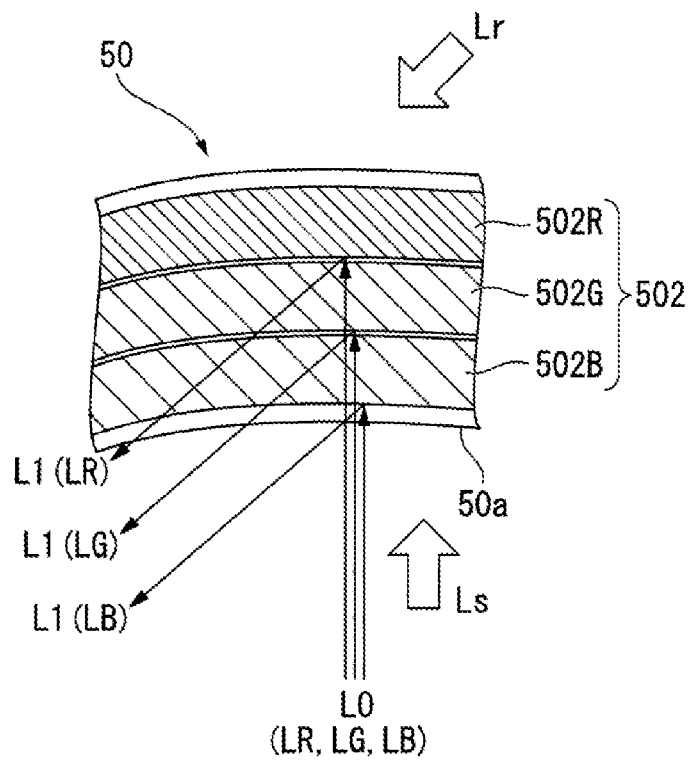
FIG. 3 is an explanatory view of interference fringes of a reflection-type volume hologram.

FIG. 3 is an explanatory view of interference fringes of a reflection-type volume hologram constituting the first diffraction element 50. As illustrated in FIG. 3, the reflection-type volume hologram constituting the first diffraction element 50 is provided with interference fringes 502 having a pitch corresponding to a specific wavelength. The interference fringes 502 are recorded as a difference in refractive index of hologram material in a hologram photosensitive layer. The interference fringes 502 are inclined in one direction relative to the first incident surface 50a of the first diffraction element 50 so as to correspond to a specific incident angle. Accordingly, the first diffraction element 50 diffracts and then deflects the image light L0 in a predetermined direction. The specific wavelength and the specific incident angle correspond to a wavelength and an incident angle of the image light L0. The interference fringes 502 can be formed by performing interference exposure on the holographic photosensitive layer by using reference light Lr and object light Ls.

In this exemplary embodiment, the image light L0 is light used for color display, including red light LR, green light LG, and blue light LB. Thus, in the first diffraction element 50, the interference fringes 502 are formed at a pitch corresponding to a specific wavelength. For example, interference fringes 502R for red light are formed at a pitch corresponding to a wavelength of 615 nm, for example, in a wavelength range from 580 nm to 700 nm of a red color gamut. Interference fringes 502G for green light are formed at a pitch corresponding to a wavelength of 535 nm, for example, in a wavelength range from 500 nm to 580 nm of a green color gamut. Interference fringes 502B for blue light are formed at a pitch corresponding to a wavelength of 460 nm, for example, in a wavelength range from 400 nm to 500 nm of a blue color gamut.

Note that, while the interference fringes 502 are drawn linearly in FIG. 3, when the image light L0 incident on the first diffraction element 50 is a spherical wave, the spherical wave is used as the object light Ls, for example, during interference exposure. In this case, the plurality of interference fringes 502 are each formed in a curved state in the hologram photosensitive layer. Accordingly, the interference fringes 502 are inclined, in a curved state, in one direction relative to the first incident surface 50a of the first diffraction element 50. Thus, when the image light L0 composed of a spherical wave having a single wavelength is incident from the normal line direction of the first incident surface 50a, the first diffraction element 50 emits diffraction light L1 having the highest diffraction efficiency in a specific direction inclined from the normal line direction. When the interference fringes 502 are curved, an inclined direction of the interference fringes 502 is defined as an inclination of a straight line connecting both ends of the interference fringe 502, for example.

As illustrated in FIG. 2, the second reflection surface 30d reflects the image light L0 emitted from the first diffraction element 50 toward the third reflection surface 30e. That is, the image light L0 incident on the second reflection surface 30d from the second deflection surface 30c provided with the first diffraction element 50 is reflected toward the second surface 302b provided with the third reflection surface 30e.

The third reflection surface 30e reflects the image light L0 emitted from the second reflection surface 30d toward the fourth reflection surface 30f. That is, the image light L0 incident on the second surface 302b provided with the third reflection surface 30e from the second reflection surface 30d is reflected toward the first surface 302a provided with the fourth reflection surface 30f.

The fourth reflection surface 30f reflects the image light L0 emitted from the third reflection surface 30e toward the second diffraction element 70. That is, the image light L0 incident on the first surface 302a provided with the fourth reflection surface 30f from the second surface 302b provided with the third reflection surface 30e is reflected toward the second diffraction element 70.

The second diffraction element 70 includes a reflection-type volume hologram. The second diffraction element 70 has a recessed curved surface in which the second incident surface 70f on which the image light L0 is incident is recessed. In other words, the second incident surface 71f has a shape in which a central portion is recessed and curved relative to a peripheral portion in the incident direction of the image light L0. Thus, the second diffraction element 70 includes positive power and can efficiently deflect the image light L0 toward the exit pupil G. The second diffraction element 70 is disposed inclined so that an angle formed with the first surface 302a is 450 or less.

A basic configuration of the reflection-type volume hologram constituting the second diffraction element 70 is the same as the basic configuration of the reflection-type volume hologram constituting the first diffraction element 50, and thus detailed description of the reflection-type volume hologram is omitted. However, the reflection-type volume hologram constituting the second diffraction element 70 is constituted by a partial reflection-type diffraction optical element configured to reflect a portion of incident light and transmit the other portion. Therefore, the second diffraction element 70 functions as a partially transmissive reflective combiner. Thus, outside light is incident on the eye E of the observer via the second diffraction element 70, and therefore the observer can visually recognize an image in which the image formed by the image light generation device 20 and the background are superimposed onto each other.

Note that the second diffraction element 70, similar to the first diffraction element 50, need only be a reflection-type diffraction element, is not limited to a volume hologram, and may be, for example, a surface relief-type diffraction element, a surface relief holographic element, or the like. Regardless of the configuration, when the image light L0 is incident from a normal line direction of the second incident surface 70f, the second diffraction element 70 has a property of emitting diffraction light having the highest diffraction efficiency in a specific direction.

The correction member 40 is provided at an outer side of the second diffraction element 70 as viewed by the observer. The correction member 40 includes a first surface 40a, a second surface 40b, and a third surface 40c. The first surface 40a is provided along the second diffraction element 70. The second surface 40b and the third surface 40c come into contact, forming a substantially right angle. The correction member 40 is bonded with the first surface 40a in contact with the second diffraction element 70. That is, the correction member 40 is provided facing a surface different from the second incident surface 70f of the second diffraction element 70 and constitutes a parallel plate together with the light-guiding member 30.

With provision of the correction member 40, the first surface 302a of the light-guiding portion 302 and the second surface 40b of the correction member 40 are disposed substantially in parallel. Thus, the light-guiding member 30 has no power with respect to outside light incident from the outside, and is a zero diopter. As a result, distortion of the background visually recognized by the observer is suppressed.

In the display module 10 of this exemplary embodiment, a first intermediate image Z1 is formed between the third lens 253 and the fourth lens 254 of the relay optical system 25. A second intermediate image Z2 is formed between the third reflection surface 30e and the fourth reflection surface 30f of the light-guiding member 30. Further, a pupil G0 is formed between the second lens 252 and the third lens 253 of the relay optical system 25. Note that an intermediate image is a location where light beams emitted from one pixel of the image light generation device 20 converge. A pupil is a location where the main beams of each angle of view constituting the image light L0 converge.

Figure 4:
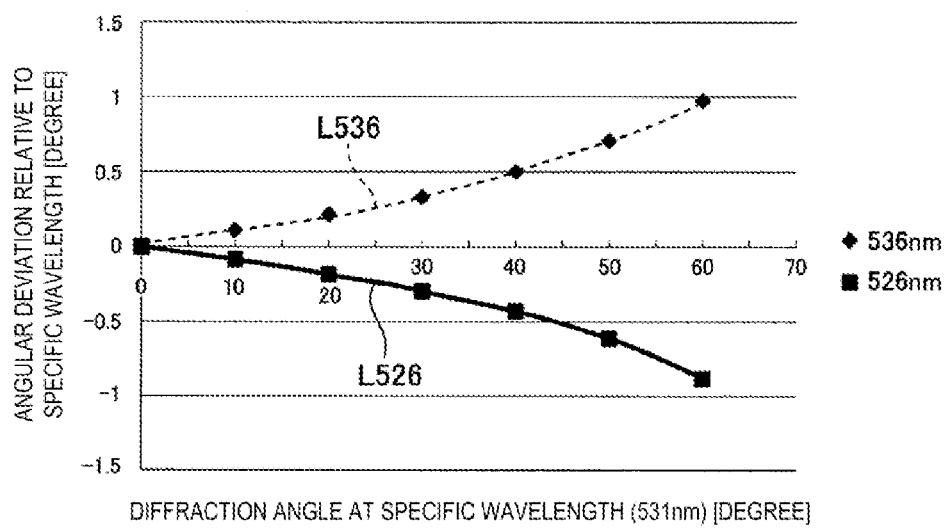
FIG. 4 is a diagram illustrating diffraction characteristics of a first diffraction element and a second diffraction element.

FIG. 4 is a diagram illustrating diffraction characteristics of the first diffraction element 50 and the second diffraction element 70.

FIG. 4 illustrates a difference in diffraction angle between a specific wavelength and a peripheral wavelength when a light beam is incident on one point on the reflection-type volume hologram. In FIG. 4, given 531 nm as the specific wavelength, a deviation in diffraction angle of light having a peripheral wavelength of 526 nm is indicated by a solid line L526, and a deviation in diffraction angle of light having a peripheral wavelength of 536 nm is indicated by a dashed line L536.

As illustrated in FIG. 4, even when light beams are incident on the same interference fringes recorded in the reflection-type volume hologram, a light beam having a longer wavelength is diffracted at a larger angle, and a light beam having a shorter wavelength is diffracted at a smaller angle. Therefore, when two diffraction elements composed of the first diffraction element 50 and the second diffraction element 70 are used, an incident angle of light having wavelengths longer than a specific wavelength and an incident angle of light having wavelengths shorter than the specific wavelength must be considered, otherwise aberration cannot be properly compensated. In addition, because the angle of diffraction varies depending on the number of interference fringes, the configuration of the interference fringes must be considered. In the display module 10 of this exemplary embodiment illustrated in FIG. 2, orientations of the first diffraction element 50 and the second diffraction element 70 relative to the image light L0 and the like are made appropriate in accordance with whether the sum of the number of times an intermediate image is formed and the number of times reflection occurs between the first diffraction element 50 and the second diffraction element 70 is an odd number or an even number.

Here, assume a virtual plane including a normal line V2 of the first incident surface 50a of the first diffraction element 70 and a normal line V4 of the second incident surface 70f of the second diffraction element 70. In the case of this exemplary embodiment, the virtual plane is the paper surface of FIG. 2, and is an XZ plane.

In this exemplary embodiment, the sum of the number of times the image light L0 is reflected and the number of times an intermediate image is generated between the first diffraction element 50 and the first diffraction element 70 is an even number. Therefore, when viewed from a normal line direction of the virtual plane, in the first diffraction element 50 and the second diffraction element 70, when light beams are incident from the normal line directions of the respective incident surfaces 50a, 70f, the directions in which the diffraction light is emitted at the highest diffraction efficiency are set to the same side with respect to the normal line directions of the respective incident surfaces 50a, 70f.

More specifically, in this exemplary embodiment, between the first diffraction element 50 and the second diffraction element 70, the image light L0 is reflected a total of three times by the second reflection surface 30d, the third reflection surface 30e, and the fourth reflection surface 30f. Further, because the first diffraction element 50 has positive power, the second intermediate image Z2, that is, one intermediate image, is generated between the first diffraction element 50 and the second diffraction element 70. Accordingly, the sum of the number of times the image light L0 is reflected and the number of times an intermediate image is generated between the first diffraction element 50 and the first diffraction element 70 is four, that is, an even number.

Accordingly, given a direction in which the image light L0 is emitted at the highest diffraction efficiency when the image light L0 is incident from the normal line direction of the first incident surface 50a as a first direction, and a direction in which the image light L0 is emitted at the highest diffraction efficiency when the image light L0 is incident from the normal line direction of the second incident surface 70f as a second direction, the first direction relative to the normal line direction of the first incident surface 50a and the second direction relative to the normal line direction of the second incident surface 70f are configured to be positioned on the same side when viewed from the normal line direction of the virtual plane.

More specifically, as illustrated in FIG. 2, when light is incident from the normal line direction relative to the first incident surface 50a of the first diffraction element 50, a first direction K11 in which diffraction light having the highest diffraction efficiency is emitted is in a position rotated in a clockwise direction CW with respect to a normal line direction K10 of the first incident surface 50a. Further, when light is incident from the normal line direction relative to the second incident surface 70f of the second diffraction element 50, a second direction K22 in which diffraction light having the highest diffraction efficiency is emitted is in a position rotated in the clockwise direction CW with respect to a normal line direction K20 of the second incident surface 70f.

That is, the first direction K11 in which the diffraction light having the highest diffraction efficiency is emitted in the first diffraction element 50 and the second direction K22 in which the diffraction light having the highest diffraction efficiency is emitted in the second diffraction element 70 are positioned on the same side with respect to the normal line directions K10, K20 of the respective incident surfaces 50a, 70f. This configuration is realized by coordinating an inclination direction of the interference fringes of the first diffraction element 50 and an inclination direction of the interference fringes of the second diffraction element 70.

According to this configuration, given a case in which a light beam having an optimum wavelength is incident from the normal line direction K10 of the first incident surface 50a of the first diffraction element 50 as reference, the diffraction light when a light beam having a wavelength longer than the optimal wavelength is incident inclines in a direction rotated in the clockwise. Accordingly, when the diffraction light of a light beam having a wavelength longer than the optimal wavelength is incident on the second incident surface 70f of the second diffraction element 70 via the second reflection surface, the third reflection surface, and the fourth reflection surface, the light beam is incident from a direction rotated further clockwise than the light beam of the optimum wavelength. Therefore, light beams having an optimal wavelength and light beams having a wavelength longer than the optimal wavelength are emitted from the second diffraction element 70 in the same direction. As a result, a reduction in resolution is less likely to occur. Therefore, according to this exemplary embodiment, wavelength compensation can be realized, and deviation of the image when the wavelength of the image light L0 varies can be suppressed.

Here, a position where an optical axis Ga of the exit pupil G and the emission surface 30h of the light-guiding member 30 intersect is defined as a reference position P. A distance S1 from the reference position P to the second deflection surface 30c is longer than a distance S2 from the reference position P to the first deflection surface 30b and longer than a distance S3 from the reference position P to the second reflection surface 30d. The distance from the reference position P to each surface is defined as a distance between a position, within the surface, closest to the reference position P and the reference position P, that is, a shortest distance of the distances from the reference position P to the surface.

In the order of travel of the light, as viewed by the observer, the image light L0 travels from the first deflection surface 30b (first reflection surface 31) toward an outer side of the face, is reflected by the first diffraction element 50 of the second deflection surface 30c, travels from the second deflection surface 30c toward a center side of the face, and is incident on the second reflection surface 30d. In this way, in the display module 10 of this exemplary embodiment, the positions of the respective surfaces and the traveling paths of the image light L0 are configured as described above, thereby causing the optical paths of the image light L0 to fold back and thus overlap each other in the interior of the light-guiding member 30.

In the display device of JP-A-2002-311379, after the image light is incident on the first reflection-type hologram disposed on the outermost side of the light-guiding member, the image light sequentially travels toward the center side of the face of the observer by being reflected five times, and is incident on the second reflection-type hologram. That is, in the display device of JP-A-2002-311379, the optical paths of the image light do not fold back and overlap each other in the interior of the light-guiding member.

While JP-A-2002-311379 describes, by way of example, a configuration in which the image light is reflected five times inside the light-guiding member, in this configuration, when the light-guiding member is longer than necessary due to an increase in screen size, the position of the image light generation device is far away from a temporal region of the observer. Therefore, there is a problem in that the wearability and a designability of the head-mounted display apparatus are reduced. In JP-A-2002-311379, because the number of times the image light is reflected inside the light-guiding member is specified as an odd number, a configuration in which the image light is reflected three times inside the light-guiding member is also conceivable. However, in this case, in contrast to the configuration described above, the light-guiding member may be too short and the position of the image light generation device may not reach the temporal region of the observer, making the head-mounted display apparatus difficult to design.

In contrast, according to the display module 10 of this exemplary embodiment, the optical paths of the image light L0 from the image light generation device 20 to the first diffraction element 50 are folded back in the interior of the light-guiding member 30. Thus, even when the screen of the image light generation device 20 is increased in size, the overall device can be made smaller without unreasonably increasing the dimensions of the display module in the left-right direction of the observer. Further, a degree of freedom of placement of the optical elements such as the image light generation device 20 and the relay optical system 25 is increased, making the display module 10 easier to design.

Further, in the display module 10 of this exemplary embodiment, the second diffraction element 70 is used, making it possible to deflect the image light L0 at an angle greater than that of specular reflection and guide the image light L0 to the eye E of the observer. Therefore, even when the screen of the image light generation device 20 is increased in size, a thickness of the light-guiding member 30 can be appropriately thinned, and a weight of the display module 10 can be reduced.

Further, in the display module 10 of this exemplary embodiment, because the orientations of the first diffraction element 50 and the second diffraction element 70 relative to the incident direction of the image light L0 are appropriately disposed, compensation can be made for color aberration generated by the first diffraction element 50 and the second diffraction element 70. As a result, deviation of the image when the wavelength varies can be suppressed and resolution can be increased.

Further, in the display module 10 of this exemplary embodiment, the correction member 40 is provided on the outer side of the second diffraction element 70, and thus the light-guiding member 30 has no power with respect to outside light incident from the outside, and is a zero diopter. As a result, distortion of the background visually recognized by the observer is suppressed, making it possible to increase a visibility of the background.

Further, in the display module 10 of this exemplary embodiment, the first diffraction element 50 and the second diffraction element 70 respectively including the incident surfaces 50a, 70f having curved shapes are supported by the light-guiding member 30, making it possible to stably maintain a positional relationship between the first diffraction element 50 and the second diffraction element 70 with high accuracy. This makes it possible to increase a reliability of the display module 10.

Further, the display device 100 of this exemplary embodiment is provided with the display module 10 having the advantageous effects described above, and therefore is compact in size and excellent in display quality.

Second Exemplary Embodiment

A second exemplary embodiment according to the present disclosure will be described below with reference to FIG. 5. The basic configuration of a display module of the second exemplary embodiment is the same as that of the first exemplary embodiment except for the position of the image light generation device. Therefore, description of the display module in its entirety is omitted.

Figure 5:
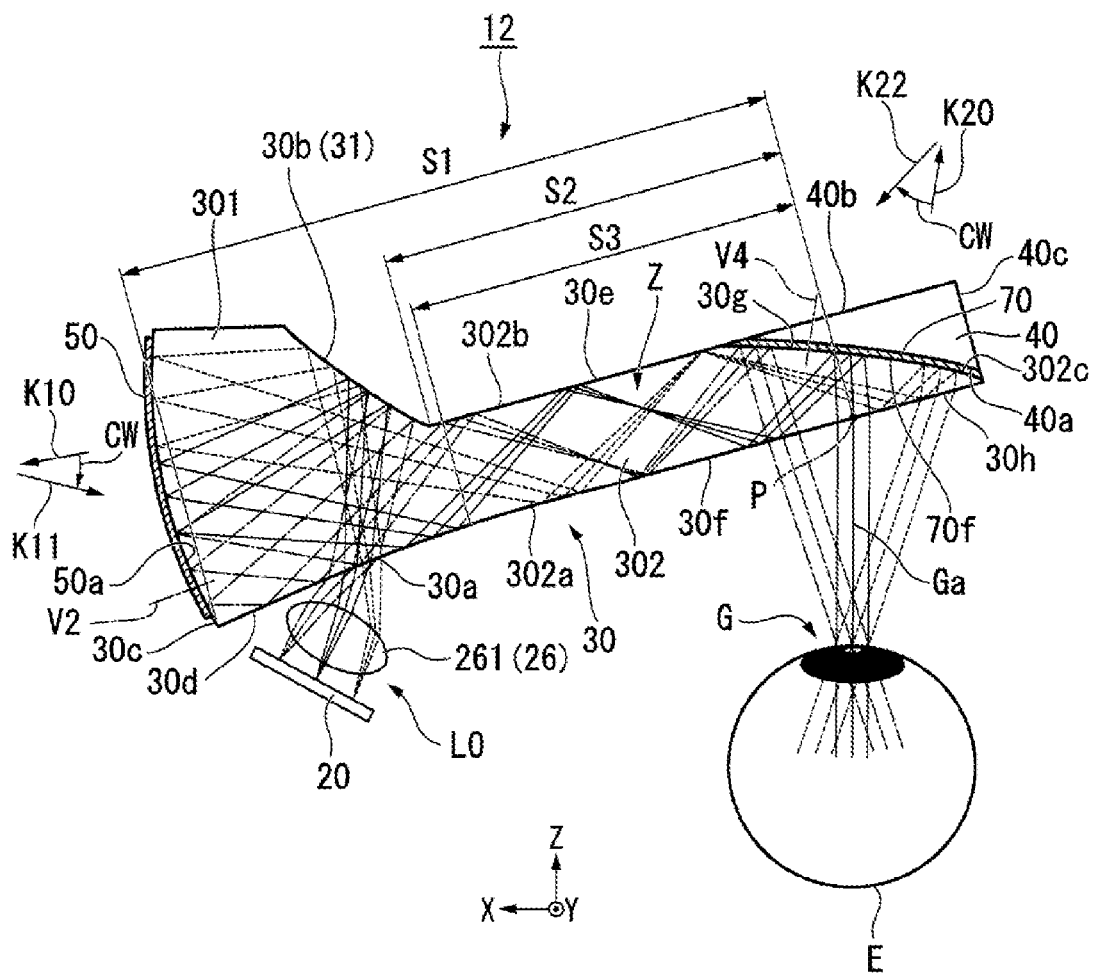
FIG. 5 is a plan view illustrating a schematic configuration of a display module according to a second exemplary embodiment.

FIG. 5 is a plan view illustrating a schematic configuration of the display module of the second exemplary embodiment.

In FIG. 5, the components common to those in FIG. 2 based on the first exemplary embodiment are denoted using the same reference numerals, and descriptions thereof are omitted.

As illustrated in FIG. 5, a display module 12 of this exemplary embodiment includes the image light generation device 20, a relay optical system 26, the light-guiding member 30, the first diffraction element 50, the second diffraction element 70, and the correction member 40.

In the case of this exemplary embodiment, the image light generation device 20 is disposed at the formation position of the first intermediate image Z1 in the display module 10 of the first exemplary embodiment. Accordingly, only one intermediate image Z is formed at the formation position of the second intermediate image Z2 in the display module 10 of the first exemplary embodiment. The relay optical system 26 is constituted by one lens 261, but the number of lenses is not particularly limited. Alternatively, the intermediate image Z (first intermediate image) is formed between the first diffraction element 50 and the second diffraction element 70, and the image light generation device 20 is disposed in a position where a distance between the image light generation device 20 and the second diffraction element 70 is shorter than a distance between the second deflection surface 30c and the second diffraction element 70.

In the case of this exemplary embodiment, because only one intermediate image Z is formed, there is a possibility that distortion aberrations will occur. In this case, an image signal supplied to the image light generation device 20 may be corrected in advance.

Other than this, the configuration of the display module 12 is the same as that of the first exemplary embodiment.

In this exemplary embodiment as well, the same advantageous effects as those in the first exemplary embodiment can be achieved, i.e., a display module and a display device compact in size and excellent in display quality can be provided.

Further, in the display module 12 of this exemplary embodiment, the image light generation device 20 is disposed at a position close to the light-guiding member 30 compared to the display module 10 of the first exemplary embodiment, and therefore the dimensions in the front-rear direction (Z-axis direction) of the display module 12 can be reduced for further miniaturization.

Note that the technical scope of the present disclosure is not limited to the above-described exemplary embodiments, and various modifications can be made to the above-described exemplary embodiments without departing from the spirit and gist of the present disclosure.

For example, while, in the above-described exemplary embodiments, description is made, by way of example, of a configuration in which the first reflection surface is provided at the first deflection surface of the light-guiding member and the first diffraction element is provided at the first deflection surface, in reverse to this configuration, the first diffraction element may be provided to the first deflection surface of the light-guiding member, and the first reflection surface may be provided to the second deflection surface. In this case, after the image light incident on the light-guiding member is diffracted and reflected by the first diffraction element, the image light is reflected by the first reflection surface to fold back the optical path, sequentially reflected by the second reflection surface, the third reflection surface, and the fourth reflection surface, and incident on the second diffraction element. The image light diffracted and reflected by the second diffraction element is emitted from the emission surface, reaches the eye of the observer, and forms a virtual image.

Further, while the above-described exemplary embodiments illustrate a configuration in which the sum of the number of times the image light is reflected and the number of times an intermediate image is generated between the first diffraction element and the second diffraction element is an even number, the sum of the number of times the image light is reflected and the number of an intermediate image is generated between the first diffraction element and the second diffraction element may be an odd number such as five times, for example. In this case, when viewed from the normal line direction of the virtual plane, the first direction relative to the normal line direction of the first incident surface and the second direction relative to the normal line direction of the second incident surface may be positioned on different sides. Accordingly, for example, one of the first direction relative to the normal line direction of the first incident surface and the second direction relative to the normal line direction of the second incident surface may be positioned in the clockwise direction and the other may be positioned in the counterclockwise direction.

Specifically, while the above-described exemplary embodiments illustrate an example in which the sum of the number of times the image light is reflected and the number of times an intermediate image is generated between the first diffraction element and the second diffraction element is four or five times, the number may be an even number other than four. Further, the sum described above may be zero times, and zero times is included in even numbers. Furthermore, the sum described above may be an odd number other than five.

Furthermore, the specific descriptions of shape, number, arrangement, material, and the like of each component of the display module and the display device are not limited to those of the above-described exemplary embodiments, and can be changed as appropriate. For example, in the above-described exemplary embodiments, the light-guiding member is entirely constituted by an integral member, but may be constituted by a plurality of divided members. For example, a space may be provided between the first diffraction element and the light-guiding member and, before being incident on the first diffraction element, the image light may be temporarily emitted into the air and then be incident on the first diffraction element. According to this configuration, the manufacture of a reflection-type volume hologram may be easier.

A display module according to one aspect of the present disclosure may have the following configurations.

(1) In a display module according to one aspect of the present disclosure, the first diffraction element may be configured to diffract the image light at a diffraction efficiency highest in a first direction when the image light is incident from a normal line direction of the first incident surface, the second diffraction element may be configured to diffract the image light at a diffraction efficiency highest in a second direction when the image light is incident from a normal line direction of the second incident surface, and the first diffraction element and the second diffraction element may be disposed so that, when a sum of a number of times the image light is reflected and a number of times an intermediate image is generated between the first diffraction element and the second diffraction element is an even number, an orientation of the first direction relative to the normal line direction of the first incident surface and an orientation of the second direction relative to the normal line direction of the second incident surface are in a same direction when viewed from a direction orthogonal to a virtual plane including a normal line of the first incident surface and a normal line of the second incident surface and, when the sum is an odd number, the orientation of the first direction relative to the normal line direction of the first incident surface and the orientation of the second direction relative to the normal line direction of the second incident surface are in different directions when viewed from a normal line direction of the virtual plane.

(2) In the display module according to one aspect of the present disclosure, a thickness of a portion of the light-guiding member provided with the first deflection surface and the second deflection surface may be thicker than a thickness of a portion of the light-guiding member provided with the third deflection surface.

(3) In the display module according to one aspect of the present disclosure, a first intermediate image of the image light may be formed between the image light generation device and the first deflection surface in an optical path of the image light, and a second intermediate image of the image light may be formed between the first diffraction element and the second diffraction element.

(4) In the display module according to one aspect of the present disclosure, the image light generation device may be disposed at a position where the first intermediate image is formed in the optical path of the image light.

(5) In the display module according to one aspect of the present disclosure, a first intermediate image of the image light may be formed between the first diffraction element and the second diffraction element in an optical path of the image light, and the image light generation device may be disposed at a position where a distance between the image light generation device and the second diffraction element is shorter than a distance between the second deflection surface and the second diffraction element.

(6) The display module according to one aspect of the present disclosure may further include a correction member provided facing a surface different from the second incident surface of the second diffraction element, and constituting a parallel plate together with the light-guiding member.

What is claimed is:

1. A display module (10, 10a, 10b) comprising:
an image light generation device (20) configured to generate image light;
a light-guiding member (30) configured to guide the image light emitted from the image light generation device (20);
a first reflection surface (31) configured to reflect the image light that is emitted from the image light generation device (20), passes through the light-guiding member (30), and is incident;
a first diffraction element (50) including a first incident surface (50a) and configured to diffract and deflect the image light that is emitted from the image light generation device (20), passes through the light-guiding member (30), and enters through the first incident surface (50a); and
a second diffraction element (70) including a second incident surface (70f) and configured to diffract and deflect the image light that is emitted from the first diffraction element (50), passes through the light-guiding member (30), and enters through the second incident surface (70f), and to emit the image light from the light-guiding member (30), thereby forming an exit pupil (G), wherein
the light-guiding member (30) includes a first deflection surface (30b), a second deflection surface (30c), a second reflection surface (30d), a third reflection surface (30e), a fourth reflection surface (30f), a third deflection surface (30g), and an emission surface (30h),
the image light emitted from the image light generation device (20) is sequentially incident on the first deflection surface (30b), the second deflection surface (30c), the second reflection surface (30d), the third reflection surface (30e), the fourth reflection surface (30f), and the third deflection surface (30g) inside the light-guiding member (30),
the first reflection surface (31) is provided at one of the first deflection surface (30b) and the second deflection surface (30c),
the first diffraction element (50) is provided at the other of the first deflection surface (30b) and the second deflection surface (30c),
the second diffraction element (70) is provided at the third deflection surface (30g), and
a distance (S1) from a reference position (P) where an optical axis (Ga) of the image light deflected by the second diffraction element (70) and the emission surface (30h) intersect to the second deflection surface (30c) is longer than a distance (S2) from the reference position (P) to the first deflection surface (30b) and longer than a distance (S3) from the reference position (P) to the second reflection surface (30d),
wherein the first incident surface (50a) has a shape in which a central portion is recessed and curved relative to a peripheral portion in the incident direction of the image light (L0),
wherein the first diffraction element includes a reflection-type volume hologram.

2. The display module according to claim 1, wherein
the first diffraction element (50) is configured to diffract the image light at a diffraction efficiency highest in a first direction (k11) when the image light is incident from a normal line direction (k10) of the first incident surface (50a),
the second diffraction element (70) is configured to diffract the image light at a diffraction efficiency highest in a second direction (k22) when the image light is incident from a normal line direction (k20) of the second incident surface (70f), and
the first diffraction element (50) and the second diffraction element (70) are disposed so that
when a sum of a number of times the image light is reflected and a number of times an intermediate image (z, z1, z2) is generated between the first diffraction element (50) and the second diffraction element (70) is an even number, an orientation of the first direction (k11) relative to the normal line direction (k10) of the first incident surface (50a) and an orientation of the second direction (k22) relative to the normal line direction (k20) of the second incident surface (70f) are in a same direction as viewed from a direction orthogonal to a virtual plane including a normal line (v2) of the first incident surface (50a) and a normal line (v4) of the second incident surface (70f) and
when the sum is an odd number, the orientation of the first direction (k11) relative to the normal line direction (k10) of the first incident surface (50a) and the orientation of the second direction (k22) relative to the normal line direction (k20) of the second incident surface (70f) are in different directions as viewed from a normal line direction of the virtual plane.

3. The display module according to claim 1, wherein
a thickness of a portion of the light-guiding member (30) provided with the first deflection surface (30b) and the second deflection surface (30c) is thicker than a thickness of a portion of the light-guiding member (30) provided with the third deflection surface (30g).

4. The display module according to claim 1, wherein
a first intermediate image (Z1) of the image light is formed between the image light generation device (20) and the first deflection surface (30b) in an optical path of the image light and
a second intermediate image (Z2) of the image light is formed between the first diffraction element (50) and the second diffraction element (70).

5. The display module according to claim 4, wherein
the image light generation device (20) is disposed at a position where the first intermediate image (Z1) is formed in the optical path of the image light.

6. The display module according to claim 1, wherein
a first intermediate image (Z1) of the image light is formed between the first diffraction element (50) and the second diffraction element (70) in an optical path of the image light and
the image light generation device (20) is disposed at a position where a distance between the image light generation device (20) and the second diffraction element (70) is shorter than a distance between the second deflection surface (30c) and the second diffraction element (70).

7. The display module according to claim 1, further comprising:
a correction member provided facing a surface different from the second incident surface (70f) of the second diffraction element (70), and constituting a parallel plate together with the light-guiding member (30).

8. A display device comprising:
the display module (10, 10a, 10b) according to claim 1 and a housing (90) configured to accommodate the display module (10, 10*a*, 10*b*).

\* \* \* \* \*